US011680181B1

(12) United States Patent
Forlander et al.

(10) Patent No.: US 11,680,181 B1
(45) Date of Patent: Jun. 20, 2023

(54) INDUSTRIAL COATING WITH COLOR-CHANGE RESPONSIVITY TO ACID AND BASE CONTACT

(71) Applicants: W. Thomas Forlander, Lafayette, LA (US); Miguel Regato, Youngsville, LA (US)

(72) Inventors: W. Thomas Forlander, Lafayette, LA (US); Miguel Regato, Youngsville, LA (US)

( * ) Notice: Subject to any disclaimer, the term of this patent is extended or adjusted under 35 U.S.C. 154(b) by 0 days.

(21) Appl. No.: 17/955,344

(22) Filed: Sep. 28, 2022

Related U.S. Application Data

(60) Provisional application No. 63/250,055, filed on Sep. 29, 2021.

(51) Int. Cl.
*C09D 121/02* (2006.01)
*C09D 7/61* (2018.01)
*C09D 7/63* (2018.01)

(52) U.S. Cl.
CPC ............. *C09D 121/02* (2013.01); *C09D 7/61* (2018.01); *C09D 7/63* (2018.01)

(58) Field of Classification Search
CPC ........... C09D 121/02; C09D 7/61; C09D 7/63
USPC ....................................................... 524/442
See application file for complete search history.

(56) References Cited

U.S. PATENT DOCUMENTS

| | | |
|---|---|---|
| 3,263,892 A | 8/1966 | Danyi et al. |
| 3,627,469 A | 12/1971 | Cheng |
| 3,667,916 A | 6/1972 | Sliva et al. |
| 3,700,603 A | 10/1972 | Rembaum |
| 3,852,034 A | 12/1974 | Gunther |
| 3,899,295 A | 8/1975 | Halpern |
| 4,015,937 A | 4/1977 | Miyamoto et al. |
| 4,098,577 A | 7/1978 | Halpern |
| 4,139,965 A | 2/1979 | Curry et al. |
| 4,162,164 A | 7/1979 | Lin |
| 4,171,982 A | 10/1979 | Lin |
| 4,191,048 A | 3/1980 | Molina |
| 4,250,382 A | 2/1981 | Libby |
| 4,298,569 A | 11/1981 | Read |
| 4,356,149 A | 10/1982 | Kitajima et al. |
| 4,407,960 A | 10/1983 | Tratnyek |
| 4,526,752 A | 7/1985 | Perlman et al. |
| 4,620,941 A | 11/1986 | Yoshikawa et al. |
| 4,675,161 A | 6/1987 | Hashimoto et al. |
| 5,110,492 A | 5/1992 | Casey |
| 5,136,850 A | 8/1992 | Bierschenk et al. |
| 5,139,957 A | 8/1992 | Grack |
| 5,232,494 A | 8/1993 | Miller |
| 5,302,194 A | 4/1994 | Tanabe et al. |
| 5,326,388 A | 7/1994 | Miller et al. |
| 5,352,282 A | 10/1994 | Miller |
| 5,478,382 A | 12/1995 | Miller et al. |
| 5,489,331 A | 2/1996 | Miller et al. |
| 5,498,282 A | 3/1996 | Miller et al. |
| 5,518,927 A | 5/1996 | Malchesky et al. |
| 5,548,010 A | 8/1996 | Franer |
| 5,645,824 A | 7/1997 | Lim et al. |
| 5,679,442 A | 10/1997 | Haindl |
| 5,855,896 A | 1/1999 | Lim et al. |
| 5,916,357 A | 6/1999 | Wang et al. |
| 5,942,438 A | 8/1999 | Antonoplos et al. |
| 5,955,025 A | 9/1999 | Barrett |
| 6,063,631 A | 5/2000 | Ignacio |
| 6,218,189 B1 | 4/2001 | Antonoplos et al. |
| 6,221,432 B1 | 4/2001 | Wang et al. |
| 6,410,926 B1 | 6/2002 | Munro et al. |
| 6,551,555 B2 | 4/2003 | Antonoplos et al. |
| 6,635,439 B2 | 10/2003 | Morrison et al. |
| 6,710,221 B1 | 3/2004 | Pierce et al. |
| 6,790,411 B1 | 9/2004 | Read |
| 6,894,095 B2 | 5/2005 | Russo et al. |
| 7,186,373 B2 | 3/2007 | Centanni |
| 7,192,554 B2 | 3/2007 | Read |
| 7,244,252 B2 | 7/2007 | Berndt |
| 7,304,021 B2 | 12/2007 | Albright et al. |
| 7,442,725 B2 | 10/2008 | Kwan et al. |
| 7,481,975 B2 | 1/2009 | Read |
| 7,651,989 B2 | 1/2010 | MacDonald et al. |
| 7,670,552 B2 | 3/2010 | Read |
| 7,790,225 B1 | 9/2010 | Calle et al. |
| 7,790,255 B2 * | 9/2010 | Semersky .......... B65D 81/3804 428/36.5 |
| 7,858,568 B2 | 12/2010 | MacDonald et al. |
| 7,858,952 B2 | 12/2010 | Feist et al. |
| 7,897,403 B2 | 3/2011 | Read |
| 7,981,687 B2 | 7/2011 | Yamaguchi et al. |
| 8,067,350 B2 | 11/2011 | Wenzel et al. |

(Continued)

FOREIGN PATENT DOCUMENTS

JP 80045846 B * 11/1980
JP 05215743 A * 8/1993

*Primary Examiner* — Kelechi C Egwim

(74) *Attorney, Agent, or Firm* — Greg Mier

(57) ABSTRACT

A latex-based surface coating that can be applied to the surface of equipment to detect any leaks of acid or base onto the equipment. The latex-based surface coating changes color when a strong acid and/or a strong base makes contact with the surface coating, thereby providing a visual indication that a leak of a strong acid and/or a strong base has occurred. The surface coating is able to provide visual indications for acids with a pH between 0 and 3 in the liquid or gas phase. The surface coating is also able to provide visual indications for bases with a pH between 9 and 14 in the liquid or gas phase.

12 Claims, No Drawings

(56) References Cited

U.S. PATENT DOCUMENTS

| | | |
|---|---|---|
| 8,198,226 B2 | 6/2012 | Albright et al. |
| 8,278,257 B2 | 10/2012 | Hawes et al. |
| 8,324,144 B2 | 12/2012 | Hawes et al. |
| 8,383,565 B2 | 2/2013 | Albright et al. |
| 8,388,131 B2 | 3/2013 | Heacock et al. |
| 8,481,331 B2 | 7/2013 | Cregger et al. |
| 8,663,998 B2 | 3/2014 | Heacock et al. |
| 8,858,887 B2 | 10/2014 | Lacy et al. |
| 8,962,521 B2 | 2/2015 | Nakatsubo et al. |
| 9,134,285 B2 | 9/2015 | Heacock et al. |
| 9,289,528 B2 | 3/2016 | Nair et al. |
| 9,291,570 B2 | 3/2016 | Nair et al. |
| 9,353,269 B2 | 5/2016 | Kaiser et al. |
| 9,486,591 B2 | 11/2016 | Heacock et al. |
| 9,726,652 B2 | 8/2017 | Lacy et al. |
| 9,746,421 B2 | 8/2017 | Heacock |
| 9,752,902 B2 | 9/2017 | Heacock et al. |
| 9,810,671 B2 | 11/2017 | Heacock et al. |
| 10,011,725 B2 | 7/2018 | Kuczynski et al. |
| 10,073,040 B2 | 9/2018 | Miyamoto et al. |
| 10,167,628 B2 | 1/2019 | Sidheswaran et al. |
| 10,324,042 B2 | 6/2019 | Heacock |
| 10,501,644 B2 | 12/2019 | Kaiser et al. |
| 10,544,315 B2 | 1/2020 | Kim |
| 10,570,519 B2 | 2/2020 | Chernyshov |
| 10,759,976 B2 | 9/2020 | Heacock et al. |
| 10,823,715 B2 | 11/2020 | Cregger et al. |
| 2003/0068824 A1 | 4/2003 | Frankel et al. |
| 2006/0229220 A1 | 10/2006 | Hawes et al. |
| 2006/0236470 A1 | 10/2006 | Sabnis et al. |
| 2006/0252663 A1 | 11/2006 | Hawes et al. |
| 2014/0264200 A1* | 9/2014 | Jasper ............... C09D 7/63 252/586 |
| 2015/0140338 A1* | 5/2015 | Morris ............... C09D 5/084 428/689 |

* cited by examiner

INDUSTRIAL COATING WITH COLOR-CHANGE RESPONSIVITY TO ACID AND BASE CONTACT

CROSS REFERENCE TO RELATED APPLICATIONS

The present application claims priority from provisional patent application No. 63/250,055, filed on Sep. 29, 2021.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC

Not applicable.

FIELD OF THE INVENTION

The subject invention relates generally to a surface coating composition with color change characteristics. More particularly, the subject invention relates to a surface coating composition with ingredients that change color when exposed to acidic or alkaline substances.

BACKGROUND OF THE INVENTION

A chemical plant is an industrial facility that manufactures (or otherwise processes) chemicals, usually on a large scale. In many instances, the chemicals manufactured or processed in a chemical plant are classified as strong acids or strong bases. Strong acids have a high pH and strong bases have a low pH. pH is a scale used to specify the acidity or basicity of an aqueous solution or other liquid solutions. pH translates the values of the concentration of the hydrogen ion in a solution—which ordinarily ranges between about 1 and $10^{-14}$ gram-equivalents per liter—into numbers between 0 and 14. In pure water, which is neutral (neither acidic nor basic), the concentration of the hydrogen ion is $10^{-7}$ gram-equivalents per liter, which corresponds to a pH of 7. A solution with a pH less than 7 is considered acidic; a solution with a pH greater than 7 is considered basic, or alkaline.

Strong acids have a very low pH, typically in the range of 0 to 4. The seven most common strong acids are hydrochloric acid, nitric acid, sulfuric acid, hydrobromic acid, hydroiodic acid, perchloric acid, and chloric acid. Strong bases have a very high pH, typically in the range of 10 to 14. Examples of strong bases include potassium hydroxide, sodium hydroxide, barium hydroxide, caesium hydroxide, sodium hydroxide, strontium hydroxide, calcium hydroxide, lithium hydroxide, and rubidium hydroxide. These types of acids and bases are highly corrosive and reactive. They can attack and destroy metal, stone, and living tissue. In addition, they can violently react with other chemicals and produce explosions, fires, and the rapid evolution of heat and toxic gases.

When strong acids and/or strong bases make contact with human skin, they can cause burns and irritation. Inhalation of strong acids and/or strong bases may cause irritation to the respiratory tract with burning pain in the nose and throat, coughing, wheezing, shortness of breath, and pulmonary edema. Eye contact with strong acids and/or strong bases can cause burns, irritation, and may cause blindness. Ingestion of strong acids and/or strong bases may cause permanent damage to the digestive tract.

Handling of strong acids and/or strong bases requires several precautions to protect personnel and property. If a leak of a strong acid and/or a strong base occurs within a process or from a storage vessel, then it is imperative to stop the leak as quickly as possible to prevent damage and harm to equipment and personnel. A reliable, fast, and visual leak detection system can facilitate the quick stoppage of a leak of a strong acid and/or a strong base.

In some cases, pH indicator patches are placed on pieces of equipment to give visual indication of an acid or base leak. The primary drawback of this solution is that the patch has a specific location, which may or may not be in the proper place to detect a leak. The present invention is a latex-based surface coating that can be applied to the entire surface area of a piece of equipment to detect any acid or base that leaks onto that piece of equipment. The latex-based surface coating changes color when a strong acid and/or a strong base comes into contact with the coating, thereby providing a visual indication that a leak has occurred.

DESCRIPTION OF THE INVENTION

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof).

The present invention is a latex-based surface coating that uses a pH indicator to change the color of the surface coating when a strong acid and/or a strong base makes contact with the surface coating. The neutral or initial color of the surface coating is bright yellow. The bright yellow color is comparable to the process safety yellow used in many industrial settings. The surface coating can be applied to pipes, valves, tanks, vents, fume hoods, hose connections, and any other equipment where acids or bases may be present. The surface coating can be applied to metal, masonry, wood, galvanized steel, painted surfaces, fiberglass, or plastic. The surface coating can be applied with a brush, roller, sprayer, or aerosol spray can then allowed to dry before use. The surface coating functions best on surface temperatures within the range of 35 to 220 degrees Fahrenheit. The surface coating is designed to detect strong acids and/or strong bases in the liquid or gas phase.

When an acid having a pH equal to or less than three contacts the surface coating of the present invention, the pH indicator in the surface coating composition changes the surface coating color from bright yellow to red. When a base having a pH equal to or greater than nine contacts the surface coating of the present invention, the pH indicator in the surface coating composition changes the surface coating color from bright yellow to blue. The pH of the acid or base making contact with the surface coating of the present invention effects the intensity of the color change. The lower the pH of the acid, the brighter the change in color to red. The higher the pH of the base, the brighter the change in color to blue.

After the surface coating is exposed to a strong acid or a strong base, the acid or base can be washed away with a neutral solution, after which the surface coating can be dried with a cloth or other means. If the acid or base remains in contact with the surface coating for a long period of time, then the acid or base may stain the surface coating. In those cases, additional layers of the surface coating composition can be applied to the stained surface for future service.

In general, the compositions of latex-based coatings vary. The various latex coating chemistries can affect the behavior of a pH indicator. The compositions of the latex-based surface coating of the present invention are provided in two embodiments. pH indicators may be added to the latex-based surface coating at 0.1 and 2.0 weight percent. Individual or combinations of pH indicators may be added, including but not limited to, azolitmin, cresolphhalein, naphtholphthalein, phenolphthalein, or thymolsulfonephthalein. In the preferred embodiments, only one pH indicator is used, namely, thymolsulfonephthalein, also known as Thymol blue. Thymolsulfonephthalein is a brownish-green or reddish-brown crystalline powder that is insoluble in water but soluble in alcohol and dilute alkali solutions.

| Chemical Name | CAS Registry No.* | Ingredient Percent |
|---|---|---|
| Embodiment 1 | | |
| 2-ethylhexyl benzoate | 5444-75-7 | 1-5 by weight |
| Kaolin | 1332-58-7 | 1-5 by weight |
| Poly Butyl Acrylate/ Poly Methyl Methacrylate | 25852-37-3 | 10-30 by weight |
| Thymol blue | 76-61-9 | 0.25 by weight |
| Embodiment 2 | | |
| Titanium Dioxide | 13463-67-7 | ≥10-≤25 by weight |
| Talc | 14807-96-6 | ≤10 by weight |
| Tetrachloroisothalonitrile | 1897-45-6 | <1 by weight |
| Heavy Paraffinic Oil | 64742-65-0 | ≤1 by weight |
| Thymol blue | 76-61-9 | 0.5 by weight |

*A CAS Registry Number is a unique and unambiguous identifier for a specific chemical substance. CAS Registry Numbers are relied upon by scientists, manufacturers, regulators, and data scientists worldwide for accurate information on chemical substances.

It is understood that two embodiments of the present invention have been disclosed by way of example and that other modifications and alterations may occur to those skilled in the art without departing from the scope and spirit of the present invention.

What is claimed is:

1. A surface coating composition comprising:
   (a) from about 60 weight percent to about 88 weight percent of a base coating;
   (b) from about 1 weight percent to about 5 weight percent of 2-ethylhexyl benzoate;
   (c) from about 1 weight percent to about 5 weight percent of kaolin;
   (d) from about 10 weight percent to about 30 weight percent of Poly Butyl Acrylate/Poly Methyl Methacrylate; and
   (e) about 0.25 weight percent of a pH indicator.

2. The surface coating composition of claim 1, wherein the base coating is a latex-based paint.

3. The surface coating composition of claim 2, where said pH indicator is thymolsulfonephthalein.

4. The surface coating composition of claim 3, where said surface coating composition has a neutral color that is bright yellow.

5. The surface coating composition of claim 4, where said neutral color of said surface coating composition changes from bright yellow to red when an acid having a pH equal to or less than three contacts said surface coating composition.

6. The surface coating composition of claim 4, where said neutral color of said surface coating composition changes from bright yellow to blue when a base having a pH equal to or greater than nine contacts said surface coating composition.

7. A method of coating a surface with a surface coating composition, said method comprising the steps of:
   (a) applying a surface coating composition to a surface wherein the surface coating composition comprises:
      (i) from about 60 weight percent to about 88 weight percent of a base coating;
      (ii) from about 1 weight percent to about 5 weight percent of 2-ethylhexyl benzoate;
      (iii) from about 1 weight percent to about 5 weight percent of kaolin;
      (iv) from about 10 weight percent to about 30 weight percent of Poly Butyl Acrylate/Poly Methyl Methacrylate; and
      (v) about 0.25 weight percent of a pH indicator.

8. The method of claim 7, wherein the base coating is a latex-based paint.

9. The method of claim 8, wherein said pH indicator is thymolsulfonephthalein.

10. The method of claim 9, wherein said surface coating composition has a neutral color that is bright yellow.

11. The method of claim 10, further comprising the step of changing said neutral color of said surface coating composition from bright yellow to red when an acid having a pH equal to or less than three contacts said surface coating composition.

12. The method of claim 10, further comprising the step of changing said neutral color of said surface coating composition from bright yellow to blue when a base having a pH equal to or greater than nine contacts said surface coating composition.

* * * * *